No. 817,230. PATENTED APR. 10, 1906.
J. DUGMORE.
MACHINE FOR STROPPING RAZORS.
APPLICATION FILED FEB. 14, 1905.
2 SHEETS—SHEET 1.
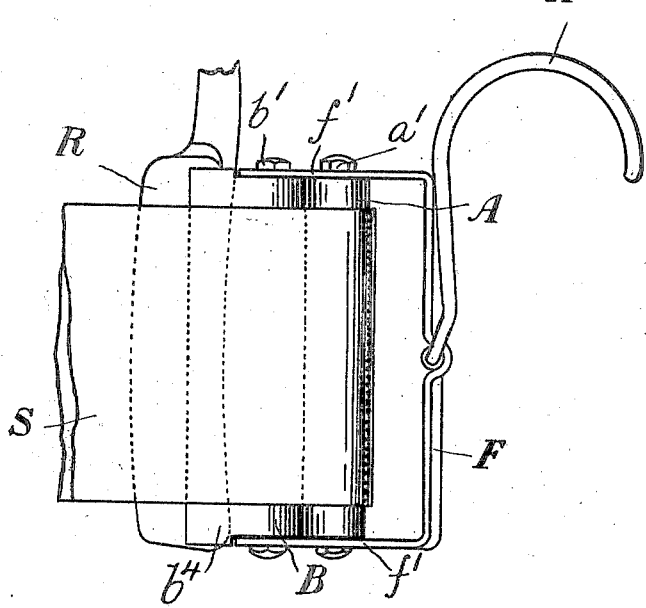
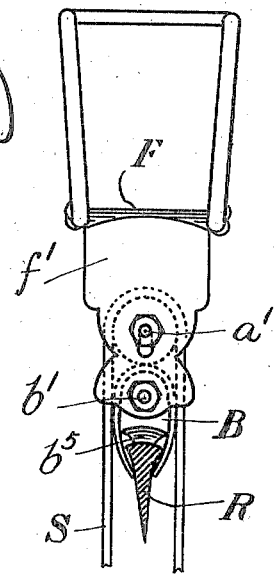
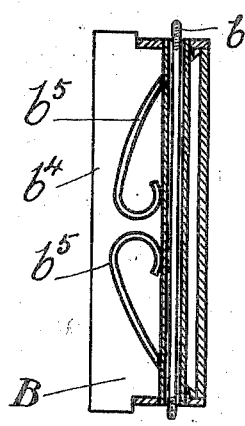
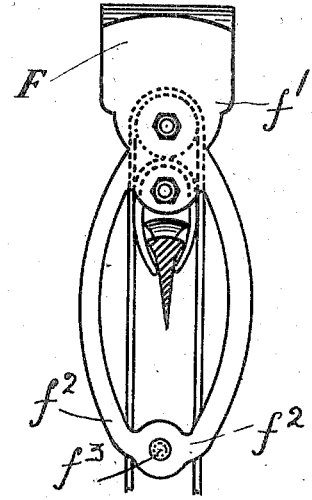
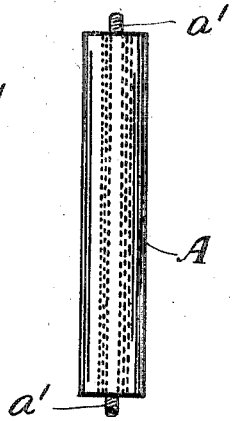
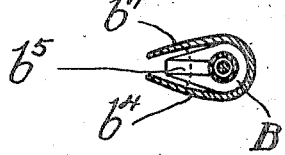
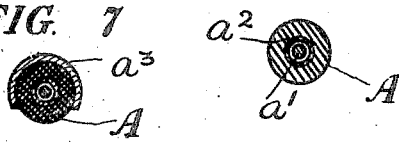
Witnesses
George G. Schoenlank
Richard H. Tucker
Inventor
James Dugmore
by H. van Oldenmuel
Attorney No. 817,230. PATENTED APR. 10, 1906.
J. DUGMORE.
MACHINE FOR STROPPING RAZORS.
APPLICATION FILED FEB. 14, 1905.
2 SHEETS—SHEET 2.
FIG. 9
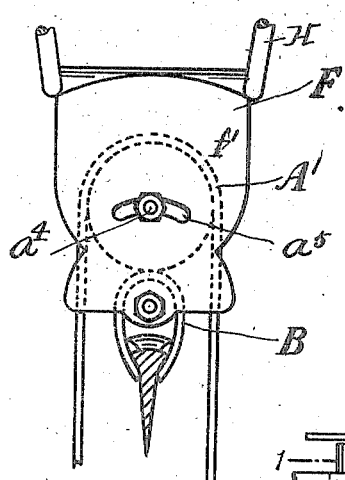
FIG. 10
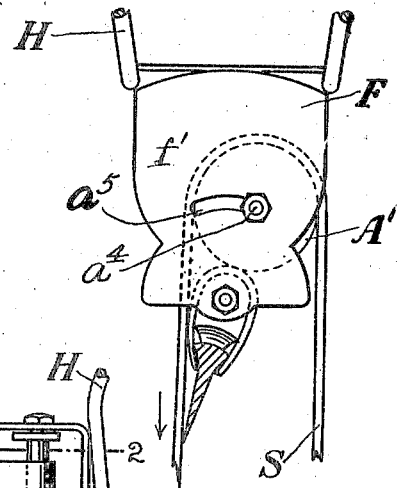
FIG. 11
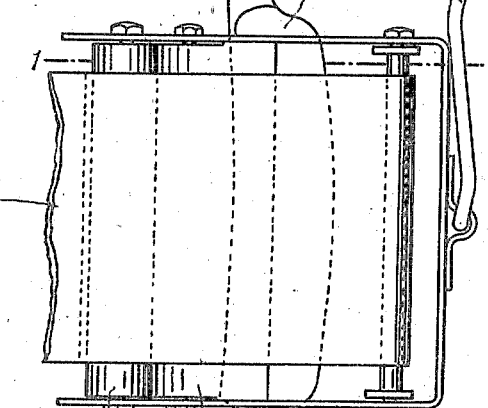
FIG. 12
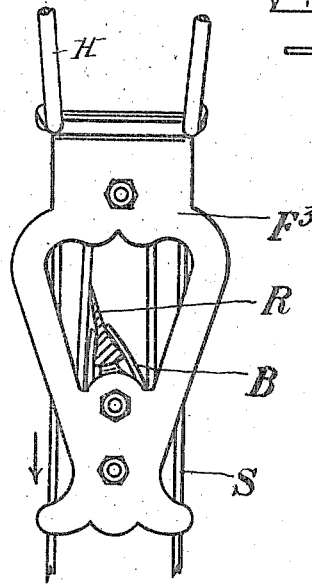
FIG. 13
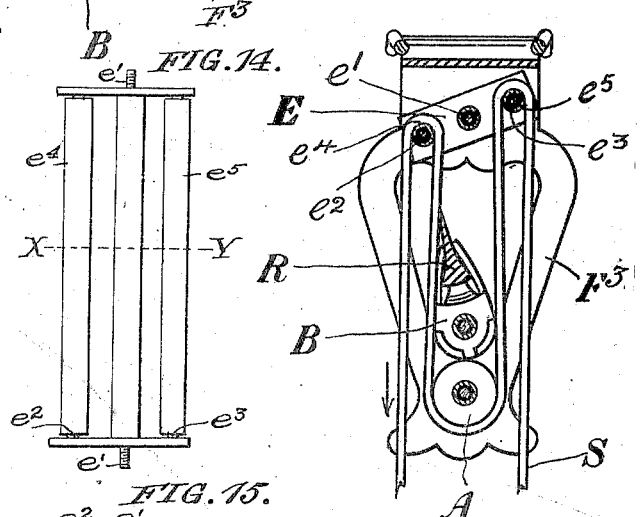
FIG. 14.
FIG. 15.
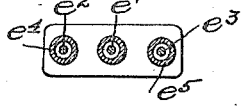
Witnesses
George G. Schoenlank
Richard H. Tucker
Inventor
James Dugmore
by H. van Oledenneel
Attorney

UNITED STATES PATENT OFFICE.

JAMES DUGMORE, OF QUINTON, ENGLAND.

MACHINE FOR STROPPING RAZORS.

No. 817,230.           Specification of Letters Patent.           Patented April 10, 1906.

Application filed February 14, 1905. Serial No. 245,603.

*To all whom it may concern:*

Be it known that I, JAMES DUGMORE, chain-maker, a subject of the King of Great Britain, residing at Rose Cottage, Bissell street, Quinton, in the county of Worcester, England, have invented certain new and useful Improvements in Machines for Stropping Razors, of which the following is a specification.

My invention relates to improvements in machines for stropping razors, and has for its object to produce a simple, cheap, and efficient form of such machine.

Figure 1 is a side elevation of a stropping-machine driven by the strop S through friction-rollers. Fig. 2 is a plan of the same machine as shown by Fig. 1, and in both the views the strop S is broken off, only the upper portion being shown upon the drawings, as is also the case in all the subsequent views. Fig. 3 is an elevation of the driving-roller A. Fig. 4 is a cross-section of the said roller shown in Fig. 3. Fig. 5 is a sectional elevation of the razor-holder rollers B, and Fig. 6 is a cross-section of the same. Fig. 7 is a section of a modification of the roller A, showing a metallic or other hard substance guard $a^3$ secured to the portion of the face over which the strop S passes and bears to prevent wear. Fig. 8 is a plan of the same machine, but with the frame carried down to $f^2 f^2$ with the connecting guard-bar $j^3$ passing across between the two sides of the frame. Fig. 9 is a plan of a similar machine, but with the driving-roller A larger in diameter and with the spindle $a'$ working in the slot $a^5$, so as to be capable of traversing around the razor-holder roller B. Fig. 10 shows the same machine as Fig. 9, but with the roller A traversed to the right side while the strop S is being pulled in the direction of the arrow by the left hand of the operator. Fig. 11 is a side elevation of a machine constructed in accordance with my new invention in a special manner to decrease the liability of the user to injury and provided with a special rocking frame. Fig. 12 is a plan of the stropping-machine shown in Fig. 11. Fig. 13 is a sectional plan on the line 1 2 of Fig. 11. Fig. 14 is an elevation of the rocking frame removed from the machine, and Fig. 15 is a cross-sectional view of the rocking frame at $x\,y$ in Fig. 14.

The frame F of my stropping-machine is generally formed from sheet metal and has turned-down ends $f'$ to carry the journals $a'$ and $b'$ of the rollers A and B, respectively, and a hook, ring, or the like H is secured to frame F for attachment to a bed-rail, dressing-stand, or other stable position. The roller A may be made of rubber or other suitable material on a tube $a^2$, or a wood or other roller may be covered or partly covered with rubber, and in some cases a hard shield $a^3$ may partly envelop the outside of the rubber for the strop to work on. The roller B is mounted also in the frame adjacent to the roller A, the journal-bearing of $a'$ being sufficiently loose to allow the periphery of the roller A to bear upon the roller B with sufficient force as the strop S is reciprocated to turn the roller B first in one and then in the opposite direction.

The construction of the roller B is shown by Figs. 5 and 6, the exterior of the roller being carried down at $b^4$ on each side to form a casing or holder for the razor R. The razor R is entered at the end and is kept tightly in the holder by the spring or springs $b^5\,b^5$, which may be made in a variety of shapes, the said springs being permanently secured within the razor-holder. The strop S passes over the roller A, and it is reciprocated by pulling alternately at each end in the usual way, the razor-blade being presented first to the inner side of the strop on one side and then to the inner side of the strop on the opposite side of the machine.

At Fig. 8 I have shown a form of my invention in which the ends $f^2$ of the frame $f'$ are extended, a cross-bar or tube $f^3$ being mounted between the two sides so as to protect the hands from accidentally coming against the edge of the razor.

In some cases I make the roller A' larger in diameter, as shown at Figs. 9 and 10, and mount the journal $a^4$ in a slot-bearing $a^5$ in the sides $f'$ of the frame F concentric with the axis of the roller B, so that the roller has an easy action and slides along the slot as the strop S is reciprocated and yet bearing on the roller B sufficiently to turn it from side to side. The employment of the slot enables a keener edge to be produced on the razor.

In some cases it is preferred to construct the stropping-machine with the razor-holder arranged to carry the razor with its edge pointing away from the operator and toward the hook H, and for this purpose it is necessary to alter the shape of the frame, as shown at $F^3$ in Figs. 11, 12, and 13, and to provide a rocking beam or rocking frame E, carrying rollers $e^4$ and $e^5$, in order that the strop may be reciprocated by the user. The rollers $e^4$ and $e^5$ are mounted upon pins $e^2$ and $e^3$, which assist to hold the rocking frame together. The rocking frame is shown in detail by Figs. 14 and 15 and is pivoted to frame $F^3$ by the centers $e'$. The strop S passes over the roller A, which reciprocates the razor-holder B by frictional contact, and its ends then pass over the rollers $e^4$ and $e^5$, returning toward the operator, by whom the strop is reciprocated. When the razor R is in the position shown by Figs. 12 and 13, the left-side of the strop is being pulled by the operator in the direction of the arrow, as shown, and it will be seen that it is practically impossible for the hand of the operator to come in contact with the edge of the razor and also that the angle of the strop to the edge of the razor is always the same. This angle may be varied by either bringing the two rollers $e^4$ and $e^5$ close together or by altering the diameters of the driving-roller A, or by both conjointly.

It will be seen that the spring razor-holder admits of a sympathetic or elastic contact between the edge of the razor and the strop, which is important in obtaining a fine edge on the razor.

What I claim then is—

1. In a razor-stropping machine, a frame, a razor-holder journaled in said frame, a driving-roller rotatable in the frame, the rear of the razor-holder and the front of the driving-roller being in frictional contact, an operating-strop passing immediately around and in contact with the driving-roller, and means for bringing the operating portion of the strop toward the razor.

2. In a razor-stropping machine, the combination of a frame, a movable razor-holder journaled in said frame, a strop, a rocking frame for bringing the operating portion of the strop toward the razor, two rollers journaled in said rocking frame and around which the strop passes, and means for operating the razor-holder.

3. In a razor-stropping machine, the combination of a frame, a razor-holder journaled in said frame, a driving-roller rotatable in the frame, the rear of the razor-holder and front of the driving-roller being in frictional contact, a rocking frame pivoted on said frame for bringing the operating portion of the strop toward the razor, two rollers in said rocking frame, and a strop engaging and operating said driving-roller and said rocking frame.

In testimony whereof I have signed my name to this specification in the presence of two subscribing witnesses.

JAMES DUGMORE.

Witnesses:
HAROLD J. C. FORRESTER,
F. GILBERT BRETTELL.